United States Patent [19]

Prabhu et al.

[11] 4,380,750

[45] Apr. 19, 1983

[54] INDIUM OXIDE RESISTOR INKS

[75] Inventors: Ashok N. Prabhu, Plainsboro; Kenneth W. Hang, Princeton Junction, both of N.J.

[73] Assignee: RCA Corporation, New York, N.Y.

[21] Appl. No.: 280,934

[22] Filed: Jul. 6, 1981

[51] Int. Cl.[3] ...................... H01C 1/012; B05D 5/12; H01B 1/08; C09D 11/00

[52] U.S. Cl. .................................... 338/308; 427/101; 252/521; 338/314; 106/20

[58] Field of Search ............... 338/306, 307, 308, 309, 338/314; 427/77, 89, 96, 126.1, 126.3, 101, 102; 252/521, 518; 106/286.1, 19, 20; 219/543; 501/20, 21; 428/433

[56] References Cited

U.S. PATENT DOCUMENTS 3,411,947 11/1968 Block .

4,045,764 8/1977 Ichinose ................................ 338/34

4,065,743 12/1977 Wahlers ............................... 338/308

4,256,796 3/1981 Hang .................................. 428/210

FOREIGN PATENT DOCUMENTS 2086142A 5/1982 United Kingdom .

*Primary Examiner*—B. A. Reynolds

*Assistant Examiner*—Teresa Walberg

*Attorney, Agent, or Firm*—Birgit E. Morris; R. Hain Swope

[57] ABSTRACT

Improved indium oxide resistor inks useful in constructing multilayer integrated circuits, particularly on porcelain-coated metal substrates, are provided. The subject inks, which are characterized by an improved temperature coefficient of resistance (TCR), comprise: indium oxide, magnesium oxide as a TCR controlling agent, a barium calcium borosilicate glass frit and a suitable organic vehicle.

10 Claims, No Drawings

INDIUM OXIDE RESISTOR INKS

This invention pertains to indium oxide thick-film resistor inks having a improved temperature coefficient of resistance and their use in multilayer electrical structures on porcelain coated metal substrates.

BACKGROUND OF THE INVENTION

The use of specialized ink formulations to form thick films having various functions on suitable substrates in the construction of multilayer integrated circuit structures is well known in the art. Such technology is of increasing interest in the fabrication of very dense multilayer circuit patterns on various substrates for a wide variety of applications in the electronics industry.

Significantly improved substrates for the fabrication of such circuits are disclosed and claimed in Hang et al., U.S. Pat. No. 4,256,796, issued Mar. 17, 1981, the disclosure of which is incorporated herein by reference. The Hang et al. substrates are metal coated with an improved porcelain composition comprised of a mixture, based on its oxide content, of magnesium oxide (MgO) or mixtures of magnesium oxide and certain other oxides, barium oxide (BaO), boron trioxide ($B_2O_3$) and silicon dioxide ($SiO_2$). The preferred metal is steel, particularly low carbon steel, which may be coated with various other metals such as, for example, copper. The porcelain compositions are applied to the metal core and fired to provide a partially devitrified porcelain coating on the metal core. The coating has a very low viscosity at its initial fusion point and then almost instantaneously obtains a high viscosity due to devitrification. The fired coatings which are preferred for hybrid circuit applications have a deformation temperature of at least 700° C. and a high coefficient of thermal expansion of at least $110\times10^{-7}$/°C.

While the porcelain coated metal substrates of Hang et al. represent a significant improvement over previously known substrate materials, they are disadvantageous only in being incompatible or poorly compatible with commercially available thick-film inks. In addition to the need to develop improved inks which would be compatible with the Hang et al. substrates, there exists a generally recognized need for a means of controlling the temperature coefficient of resistance (TCR) which moves rapidly away from zero or optimum as resistor values increase.

In accordance with this invention, a means is provided whereby the TCR of indium oxide resistors can be controlled within acceptable limits, i.e., within about 350 ppm/°C. plus or minus, even for high value resistors.

SUMMARY OF THE INVENTION

The improved resistor inks provided in accordance with this invention comprise indium oxide, magnesium oxide as a TCR controlling ingredient, a barium calcium borosilicate glass frit and a suitable organic vehicle.

DETAILED DESCRIPTION OF THE INVENTION

In accordance with this invention, there are provided improved medium and high value resistor inks, i.e., inks having a value of from about 500 ohms per square to 1 meg ohms per square and above, useful in the production of complex single or multilayer thick-film circuits on porcelain-coated metal circuit boards. While the resistor inks of this invention are particularly useful in connection with circuits formed on the Hang et al. porcelain-coated metal boards and various types of thick-film inks specifically formulated therefor, they can be effectively utilized with conventional boards, e.g., alumina boards.

The novel resistor inks of this invention are comprised of indium dioxide, magnesium dioxide, a barium calcium borosilicate glass frit, and a suitable organic vehicle. With the addition of magnesium oxide as a TCR controlling component in accordance with this invention, resistor inks can be prepared which have high resistance and, unexpectedly, acceptable TCR values.

The indium oxide should be of high purity and, preferably, have a particle size of between about 1.0 and 1.2 micrometers. Indium oxide comprises from about 25 to about 80 percent, preferably from about 30 to about 45 percent, by weight, of the subject inks.

The magnesium oxide TCR controlling component of the subject inks comprises, on a weight basis, from about 1 to about 20 percent, preferably from about 3 to about 8 percent, of the ink formulation. By varying the magnesium oxide content of the subject inks, the TCR of films formed therefrom, which is usually a large negative value, may be brought well within acceptable tolerances and often close to zero.

The barium calcium borosilicate glass frit of the novel inks of this invention consists of, on a weight basis:

(a) from about 40 to about 55 percent, preferably about 52 percent, of barium oxide;

(b) from about 10 to about 15 percent, preferably about 12 percent, of calcium oxide;

(c) from about 14 to about 25 percent, preferably about 16 percent, of boron trioxide; and (d) from about 13 to about 23 percent, preferably about 20 percent, of silicon dioxide. The glass frit powder comprises from about 5 to about 60 percent, preferably from about 30 to about 45 percent, by weight, of the subject inks.

The organic vehicles are binders such as, for example, cellulose derivatives, particularly ethyl cellulose, synthetic resins such as polyacrylates or methacrylates, polyesters, polyolefins and the like. In general, conventional vehicles utilized in inks of the type described herein may be used in the subject inks. Preferred commercially available vehicles include, for example, pure liquid polybutenes available as Amoco H-25, Amoco H-50, and Amoco L-100 from Amoco Chemicals Corporation, poly n-butylmethacrylate available from E. I. duPont de Nemours and Co., and the like.

The above resins may be utilized individually or in any combination of two or more. A suitable viscosity modifier can be added to the resin material if desired. These modifiers can be solvents such as those conventionally used in similar ink compositions, e.g., pine oil, terpineol, butyl carbitol acetate, an ester alcohol available from Texas Eastman Company under the trademark Texanol and the like, or solid materials such as, for example, a castor oil derivative available from N.L. Industries under the trademark Thixatrol. The organic vehicle comprises from about 10 to about 35 percent by weight, preferably from about 20 to about 30 percent by weight, of the subject inks.

The improved resistor inks of this invention are applied to the substrate board, e.g., conventional alumina boards or the improved porcelain-coated metal boards of Hang et al., by conventional means, i.e., screen printing, brushing, spraying, and the like, with screen printing being preferred. The coating of ink is then dried in air at 100°-125° C. for about 15 minutes. The resulting film is then fired in nitrogen at peak temperatures of from 850° to 950° C. for from 4 to 10 minutes. As is conventional in the art, the subject resistor inks are generally applied and fired on the substrate board after all conductor inks have been applied and fired. The resistor values of the fired films can be adjusted by conventional means such as laser trimming or air abrasive trimming. Films formed from the subject resistor inks have demonstrated excellent TCR values, current noise, laser trimmability and stability to the effects of thermal shock, solder dipping, thermal storage, power loading and humidity. They also demonstrate excellent chemical compatibility with the Hang et al. porcelain coated metal boards and films formed from inks specifically developed therefor.

The following Example further illustrates this invention, it being understood that the invention is in no way intended to be limited to the details described therein. In the Example, all parts and percentages are on a weight basis and all temperatures are in degrees Celsius unless otherwise stated.

EXAMPLE

Resistor inks were prepared from the following formulations:

| Ink No. | $In_2O_3$ | MgO | Glass | Vehicle |
|---|---|---|---|---|
| A | 38.46 | — | 35.90 | 25.64 |
| B | 33.33 | 5.00 | 38.33 | 23.34 |
| C | 37.04 | — | 37.04 | 25.92 |
| D | 34.09 | 4.55 | 38.64 | 22.72 |
| E | 38.46 | — | 35.90 | 25.64 |
| F | 30.30 | 4.55 | 40.91 | 22.73 |
| G | 40.00 | — | 34.67 | 25.33 |
| H | 30.30 | 6.06 | 37.88 | 22.73 |

In the above formulations, the glass powder had the following composition, weight percent given in parentheses: BaO (51.59); CaO (12.58); $B_2O_3$ (15.62); and $SiO_2$ (20.21).

The vehicle was a 6 percent solution of ethyl cellulose in the ester alcohol Texanol. Formulations F and H contained 1.51 and 3.03 percent, respectively, additional Texanol to adjust the rheology of the ink.

The powder ingredients were combined with the organic vehicle, initially mixed by hand and then on a 3 roll mill with shearing to obtain a smooth paste suitable for screen printing. Additional vehicle was added to replace loss during mixing and to assure proper rheology.

Copper conductor inks were applied and fired onto a porcelain-coated steel substrate of the type described by Hang et al. The above inks were then printed onto the substrate using a 325 mesh stainless steel screen, 0.3-0.6 mil thick emulsion, dried in air at 125°±10° for about 15 minutes and fired in nitrogen at a peak temperature of 900°±10° for 4-7 minutes at peak temperature. The sheet resistivity and both hot and cold TCR were determined for each formulation. The results are reported in the following Table.

TABLE

| Ink No. | Sheet Resistivity KΩ/□ | Hot TCR (+25° to 125°) (ppm/°C.) | Cold TCR (+25° to −80°) (ppm/°C.) |
|---|---|---|---|
| A | 96.5 | −89 | −94 |
| B* | 84.7 | +180 | +190 |
| C | 213. | −390 | −473 |
| D* | 276.1 | +80 | +174 |
| E | 551. | −396 | −455 |
| F* | 1822. | −92 | −85 |
| G | 417. | −385 | −418 |
| H* | 2456. | −58 | −16 |

*contains magnesium oxide

The positive effect on TCR of the presence of magnesium oxide in the formulations of this invention is readily apparent from the data in the Table. It would be expected, for example, in going from ink E to F that the over threefold increase in sheet resistivity would cause the TCR to be at about −1000. The addition of magnesium oxide in accordance with this invention, however, unexpectedly results in an over fourfold reduction in both hot and cold TCR.

We claim:

1. A resistor ink suitable for forming a resistor film on a circuit board comprising:
   (a) from about 25 to about 80 percent by weight of indium oxide;
   (b) from about 1 to about 20 percent by weight of magnesium oxide;
   (c) from about 5 to about 60 percent by weight of a barium calcium borosilicate glass frit; and
   (d) from about 10 to about 35 percent by weight of a suitable organic vehicle.

2. A resistor ink in accordance with claim 1, wherein said ink comprises: from about 30 to about 45 percent by weight of indium oxide; from about 3 to about 8 percent by weight of magnesium oxide; from about 30 to about 45 percent by weight of said glass; and from about 20 to about 30 percent by weight of said vehicle.

3. A resistor ink in accordance with claim 1, wherein said glass frit consists of: from about 40 to about 55 percent by weight of barium oxide; from about 10 to about 15 percent by weight of calcium oxide; from about 14 to about 25 percent by weight of boron trioxide; and from about 13 to about 23 percent by weight of silicon dioxide.

4. A resistor ink in accordance with claim 3, wherein said glass frit consists of about 52 percent by weight of barium oxide, about 12 percent by weight of calcium oxide, about 16 percent by weight of boron trioxide, and about 20 percent by weight of silicon dioxide.

5. A circuit board having on a portion of the surface thereof a coating of a resistor ink comprising:
   (a) from about 25 to about 80 percent by weight of indium oxide;
   (b) from about 1 to about 20 percent by weight of magnesium oxide;
   (c) from about 5 to about 60 percent by weight of a barium calcium borosilicate glass frit; and
   (d) from about 10 to about 35 percent by weight of a suitable organic vehicle.

6. A circuit board in accordance with claim 5, wherein said board is porcelain-coated metal.

7. A circuit board in accordance with claim 6, wherein said metal is steel.

8. An electronic assembly comprising a circuit board having a circuit thereon, said circuit containing a resistor film formed by applying and firing a resistor ink comprising:

(a) from about 25 to about 80 percent by weight of indium oxide;

(b) from about 1 to about 20 percent by weight of magnesium oxide;

(c) from about 5 to about 60 percent by weight of a barium calcium borosilicate glass frit; and (d) from about 10 to about 35 percent by weight of a suitable organic vehicle.

9. An electronic assembly in accordance with claim 8, wherein said circuit board is a porcelain-coated metal circuit board.

10. An electronic assembly in accordance with claim 9, wherein said metal is steel.

* * * * *